United States Patent [19]

Souza

[11] Patent Number: 5,782,326
[45] Date of Patent: Jul. 21, 1998

[54] KIT AND METHOD FOR BYPASSING A TORQUE CONVERTER OF A TRANSMISSION

[76] Inventor: Ronald J. Souza, 7105 Blue Springs Way, Citrus Heights, Calif. 95621

[21] Appl. No.: 707,496

[22] Filed: Sep. 24, 1996

Related U.S. Application Data

[60] Provisional application No. 60/022,500 Jul. 1, 1996.
[51] Int. Cl.[6] .......................... F16H 45/02; B60K 17/02
[52] U.S. Cl. ................... 192/3.26; 192/3.3; 192/DIG. 1; 74/730.1; 29/401.1
[58] Field of Search ....................... 192/3.21, 3.25, 192/3.26, 3.28, 3.3, 3.33, DIG. 1; 74/730.1, 732.1; 475/59; 29/401.1, 889.5

[56] References Cited

U.S. PATENT DOCUMENTS

| | | | |
|---|---|---|---|
| 2,642,168 | 6/1953 | Black et al. | 192/3.26 |
| 3,382,735 | 5/1968 | Gatiss | 29/401.1 X |
| 3,625,323 | 12/1971 | Hetmann | 192/3.26 |
| 3,929,211 | 12/1975 | Maddock | 192/3.33 X |

*Primary Examiner*—Richard M. Lorence
*Attorney, Agent, or Firm*—Bradley P. Heisler

[57] ABSTRACT

A kit and a method are provided for modifying an automatic transmission such as a turbo-400 hydromatic transmission. Before modification the automatic transmission couples an engine crankshaft 4 to a forward clutch drum assembly 3 through a fluid coupling such as a torque converter. This kit provides a lockup shaft 10 selectively coupleable between the engine crankshaft 4 and the forward clutch drum assembly 3. As modified, the forward clutch drum assembly 3 can be selectively driven either off of the torque converter turbine 32 or off of the lockup shaft 10 coupled mechanically to the engine crankshaft 4. The lockup shaft 10 extends through intervening structures from the crankshaft 4 out to the modified forward clutch drum assembly 3 where it connects to a lockup hub 20. A drive tube 30 of hollow cylindrical construction surrounds the lockup shaft 10 and is secured to the torque converter turbine 32 within the torque converter housing 8 which is driven by the torque converter pump 9. The drive tube 30 is also coupled to a lock-up drum 40 and forward drum 50, along with a direct hub 60. A forward piston 80 and lockup piston 90 along with forward clutch plates 88 and lockup clutch plates 98 cause the modified forward clutch drum assembly 3 to selectively lock to a forward clutch hub 70 in a manner either providing rotation to the forward clutch hub 70 at the rate of the drive tube 30 through the torque converter turbine 32 or to the lockup shaft 10 at a rate matching that of the engine crankshaft 4. A lockup mode for the automatic transmission is thus provided when desired which provides direct coupling of the engine crank shaft 4 to the forward clutch drum assembly 3, effectively bypassing the torque converter.

15 Claims, 11 Drawing Sheets

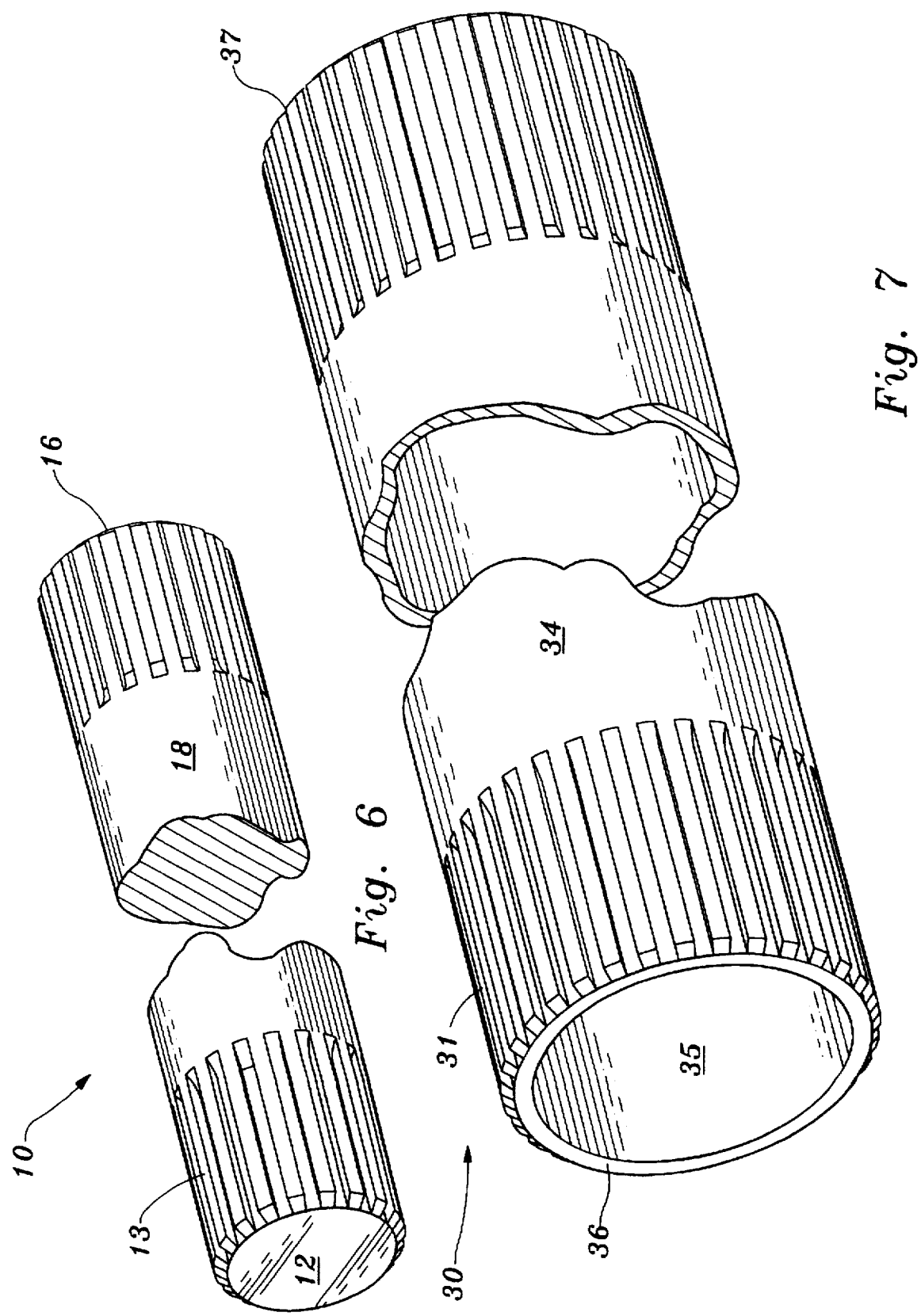

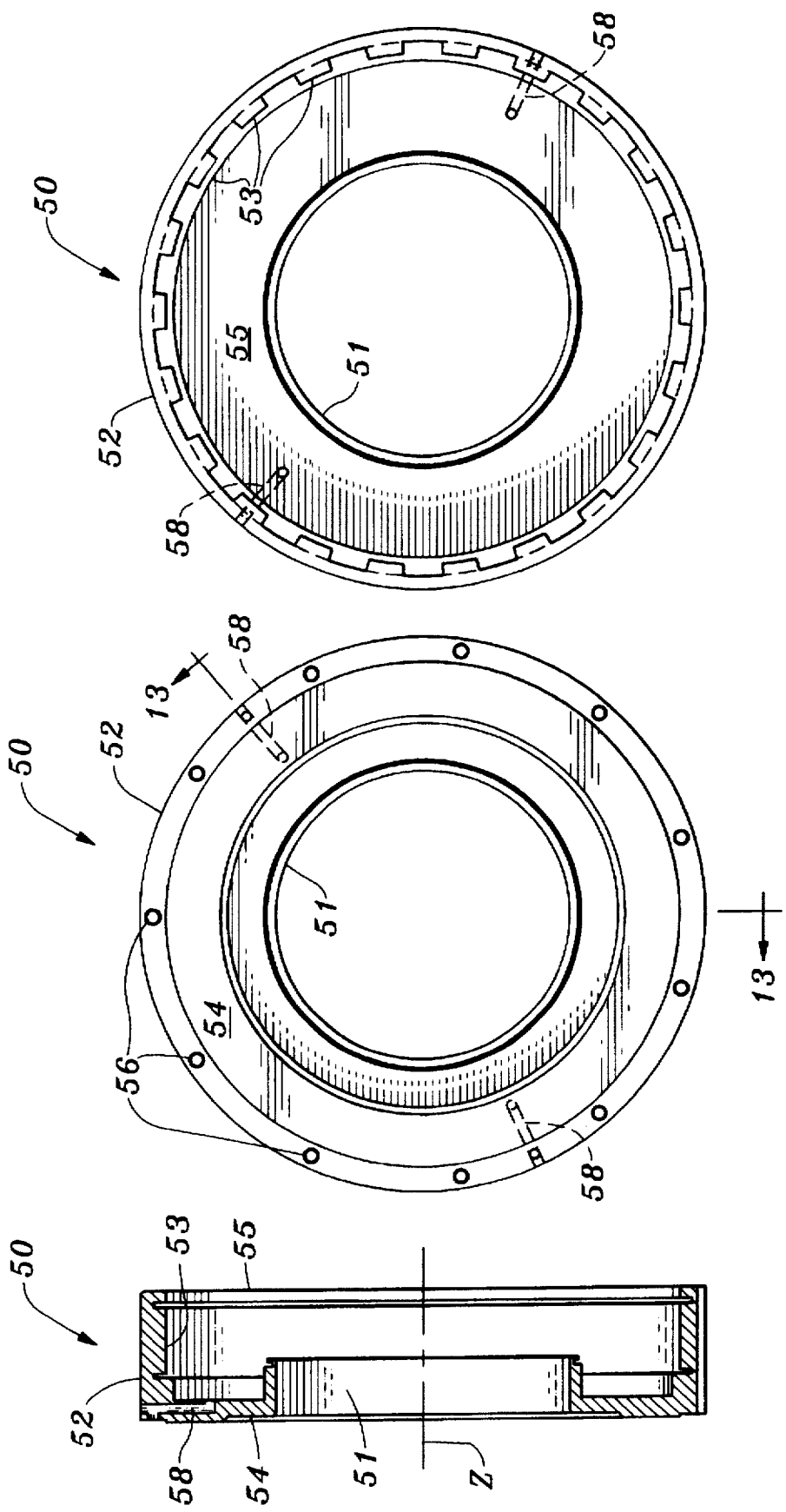

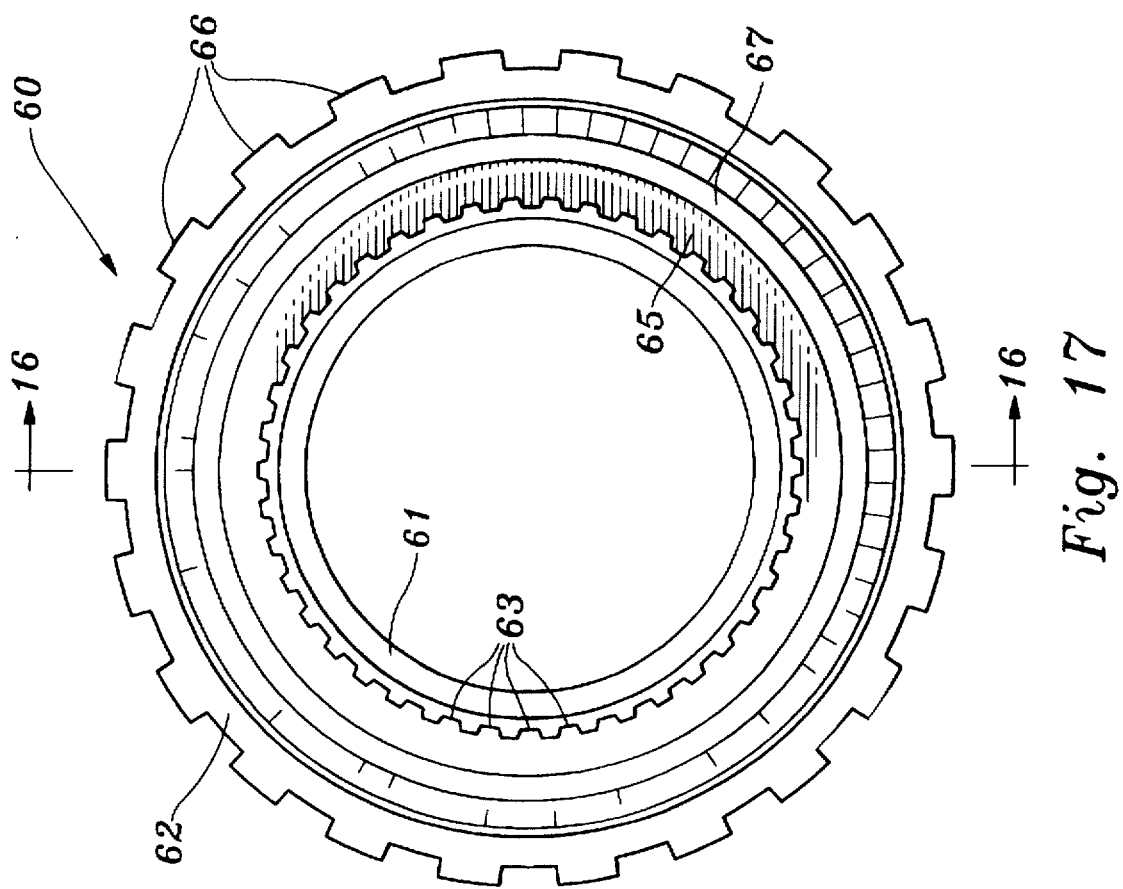
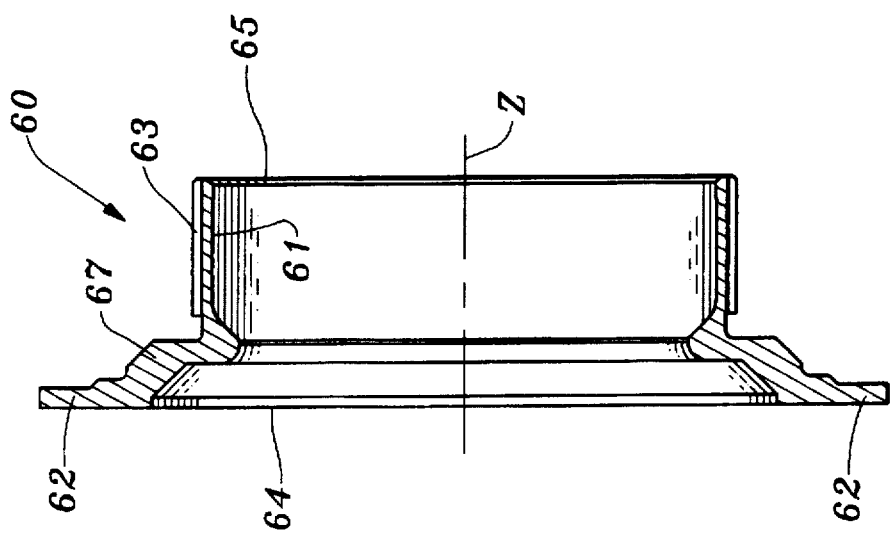

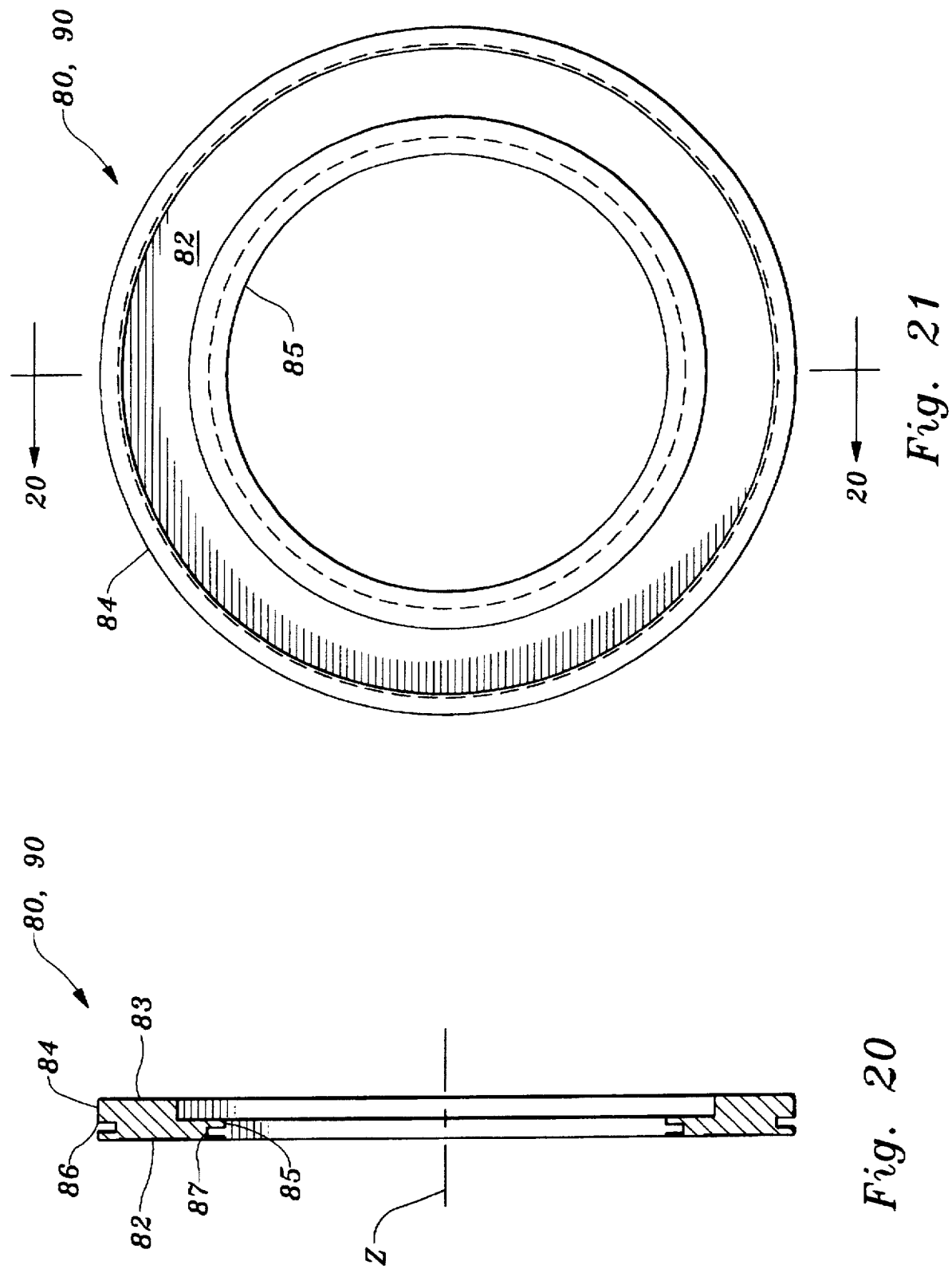

KIT AND METHOD FOR BYPASSING A TORQUE CONVERTER OF A TRANSMISSION

CROSS-REFERENCE TO RELATED APPLICATIONS

This application claims the benefit of U.S. Provisional patent application Ser. No. 60/022,500, filed on Jun. 26, 1996.

FIELD OF THE INVENTION

The following invention relates to automatic transmissions for transmission of shaft power from an engine to the wheels of a vehicle. More particularly, this invention relates to automatic transmissions which have a fluid coupling or torque converter included therein and which can direct power to a modified forward clutch drum assembly without any difference in rotational speed between the crankshaft of the engine and the modified forward clutch drum assembly, when desired.

BACKGROUND OF THE INVENTION

Motor vehicles are typically equipped with a transmission between the output crankshaft of the engine and the drive train leading to the wheels of the vehicle. The transmission selects different gears to allow the engine to operate within a smaller range of rotational speeds (i.e. RPM) while the wheels of the vehicle can pass through a greater variety of speeds. One type of vehicle transmission is referred to as an automatic transmission because the transmission shifts between different gears for different power transmission ratios, not manually, but rather automatically when different speeds or loads are demanded of the vehicle.

One of the most well known automatic transmissions is the Turbo-400 hydramatic transmission first manufactured by the General Motors Corporation. The Turbo-400 transmission, and similarly arranged transmissions, include two planetary gear sets for three forward gears and one set for reverse. Transmission of force is effected by a fluid coupling or torque converter between the engine crankshaft and the planetary gear sets of the transmission.

At all times, the Turbo-400 hydramatic transmission transmits power through the torque converter. The torque converter does not provide a direct mechanical link between the engine and other parts of the transmission and drive train of the vehicle. Rather, the torque converter utilizes a pump which rotates at the engine's speed and is adjacent to a turbine. The turbine is directly mechanically coupled to other portions of the automatic transmission and drive train. The turbine is caused to rotate by the action of the torque converter pump upon a fluid located within the torque converter housing in which both the turbine and the torque converter pump are located.

This fluid coupling between the turbine and pump is advantageous in that it can multiply the torque provided to the wheels of the vehicle when the vehicle is at stand still or is just beginning to move. At this time, the pump and the turbine would rotate at significantly different speeds. As the vehicle speed increases, the turbine and pump begin to rotate at speeds which are closer to each other.

Typically, at higher speeds vehicles do not require as much torque to maintain their speed. Hence, the added torque provided by the torque converter is no longer advantageous. At high speeds, the lack of a direct mechanical link between the engine and the automatic transmission acts as a liability in that the fluid coupling does not allow the vehicle to utilize all of the rotational energy which is supplied by the engine. As a result, top attainable speed is diminished and fuel economy for the vehicle is diminished. In addition, when a vehicle is on a long downgrade it is often desirable to use compression within the cylinders of the engine itself to provide braking for the vehicle, rather than exhaust the friction brakes of the vehicle. Because the torque converter does not provide a direct link between the crankshaft of the engine and other portions of the drive train of the vehicle, such "dynamic braking" is not effective.

While the manual transmission does provide a direct link between the engine and other portions of the drive train of the vehicle, the manual transmission does not provide the convenience of operation of the automatic transmission and does not have the benefit of the torque converter; which is increased torque at standstill or low speeds. In some automatic transmission applications, such as professional drag racing, high stall torque converters are utilized to maximize torque, and hence acceleration, at the starting line. Such high stall torque converters are particularly inefficient at high vehicle speeds, thus limiting the top speed of the drag racer.

Accordingly, a need exists for an automatic transmission which can enjoy the benefits of the torque converter and yet selectively provide a direct lockup between the engine and the automatic transmission when desired. Such a transmission would preferably have a size and configuration which would allow it to replace the turbo hydramatic transmission or to replace the torque converter and modified forward clutch drum assembly of the Turbo-400 hydramatic transmission without requiring significant alteration of other portions of the transmission itself, the drive train, or the engine.

SUMMARY OF THE INVENTION

This invention provides a modified Turbo-400 hydramatic transmission which has the improvement that the modified forward clutch drum assembly can be locked up with the crankshaft of the engine when desired, effectively bypassing the torque converter of the transmission. The torque converter is still allowed to operate when the lockup system of the transmission is deactivated. This provides the vehicle with high torque at start up and low speeds while allowing maximum efficiency and higher top speeds when locked up.

The Turbo-400 hydramatic transmission is modified by having the input shaft thereof replaced with a hollow cylindrical drive tube. This drive tube is still coupled at a first end to the turbine of the torque converter and coupled at a second end to a forward drum of the modified forward clutch drum assembly. A lockup shaft is oriented within the hollow interior of the drive tube. The lockup shaft has an input end connected directly to the crankshaft pilot hub of the torque converter housing and an output end coupled to a lockup hub which is adjacent to the forward drum of the modified forward clutch drum assembly. A direct hub and forward clutch hub of the modified forward clutch drum assembly are configured adjacent the lockup hub and on a side of the lockup hub opposite the forward drum.

A pump, pump housing, and stator hub are provided adjacent the forward drum and between the forward drum and the torque converter. The pump and stator hub direct fluid under pressure against pistons interposed between the forward drum and the lockup hub and between the direct hub and the forward clutch hub. Flow of hydraulic fluid against the pistons and through the stator hub is controlled by a solenoid which can be controlled by the operator or by various different vehicle performance criteria, such as vehicle speed.

When the vehicle is initially started from a stand still, the lockup hub is not applied but the forward piston is applied, causing the forward drum and forward clutch hub to be locked together such that the gear box of the automatic transmission receives power through the torque converter and without a direct link to the crankshaft. When it becomes desirable to have the transmission lock up with the crankshaft of the engine, the lockup piston is applied, causing the lockup hub to be locked into common rotation with the forward drum and forward clutch hub. Because the lockup hub is coupled to the lockup shaft which is coupled to the torque converter housing which is coupled directly to the crankshaft, the entire modified forward clutch drum assembly then begins rotating with the crankshaft and a direct mechanical link is achieved between the modified forward clutch drum assembly and the engine.

The modified forward clutch drum assembly and pump assembly are configured with a profile which takes up a similar amount of space to that which would otherwise be taken up by the modified forward clutch drum assembly and pump assembly of the standard Turbo-400 hydramatic transmission. Thus, the modified Turbo-400 hydramatic transmission of this invention provides for selective lockup of the modified forward clutch drum assembly to the engine without requiring modification to the engine or the gear box adjacent the modified forward clutch drum assembly, or other portions of the vehicle drive train.

OBJECTS OF THE INVENTION

Accordingly, a primary object of the present invention is to provide an automatic transmission which has both the benefits of a torque converter and the benefits of direct mechanical coupling between the engine, the modified forward clutch drum assembly, and gears of the automatic transmission.

Another object of the present invention is to provide a modified Turbo-400 hydramatic transmission which can replace a standard Turbo-400 hydramatic transmission without requiring alteration of the gear box of the transmission or the engine of the vehicle.

Another object of the present invention is to provide an automatic transmission which has superior fuel economy and high speed performance when compared to other automatic transmissions.

Another object of the present invention is to provide an automatic transmission which provides a vehicle operator with a high level of dynamic braking when desired.

Another object of the present invention is to provide an automatic transmission which has a modified forward clutch drum assembly which is mechanically linked to the crankshaft of the engine.

Another object of the present invention is to provide an automatic transmission which is of a high strength durable construction, is easy to assemble and can fit between an engine and other portions of the drive train without modification of the vehicle or engine.

Another object of the present invention is to provide an automatic transmission which benefits from decreased cooling system temperatures for the engine and transmission when compared to other automatic transmissions.

Another object of the present invention is to provide an automatic transmission which helps the vehicle to have lower pollutant emissions.

Another object of the present invention is to provide an automatic transmission which has a higher torque converter stall speed than other automatic transmissions and yet still has high fuel efficiency and high speed performance, to improve high altitude acceleration and reduce "stall-out" tendencies of the automatic transmission.

Other further objects of this invention will become apparent from a careful reading of the detailed description included herein and from a careful review of the drawing figures.

BRIEF DESCRIPTION OF THE DRAWING FIGURES

FIG. 1 is a full sectional view of a torque converter and modified forward clutch drum assembly of a prior art Turbo-400 hydramatic transmission such as that manufactured by the General Motors Corporation. Portions of the components shown in FIG. 1 which are subject to modification by this invention are shown with solid lines, while other portions which remain substantially unchanged with this invention are shown in phantom.

In FIG. 2, the modified forward clutch drum assembly is shown in neutral or reverse, with the forward clutch hub disengaged.

FIG. 6 is a perspective view of the lockup shaft of this invention detached from other portions of the transmission.

FIG. 7 is a perspective view of the drive tube of this invention detached from other portions of the transmission.

FIG. 13 is a sectional view of the forward drum of this invention taken along lines 13—13 of FIG. 14 and revealing interior details of the forward drum of this invention.

FIG. 14 is a front elevation view of the forward drum of this invention.

FIG. 15 is a rear elevation view of the forward drum of this invention.

FIG. 16 is a full sectional view of the direct hub of this invention, the view taken along lines 16—16 of FIG. 17.

FIG. 17 is a rear elevation view of the direct hub of this invention.

FIG. 20 is a full sectional view of the forward piston of this invention, taken along lines 20—20 of FIG. 21.

FIG. 21 is a front elevation view of the forward piston of this invention, it being understood that the lockup piston is preferably identical in configuration to the forward piston.

DETAILED DESCRIPTION OF THE PREFERRED EMBODIMENT

Figure 1:
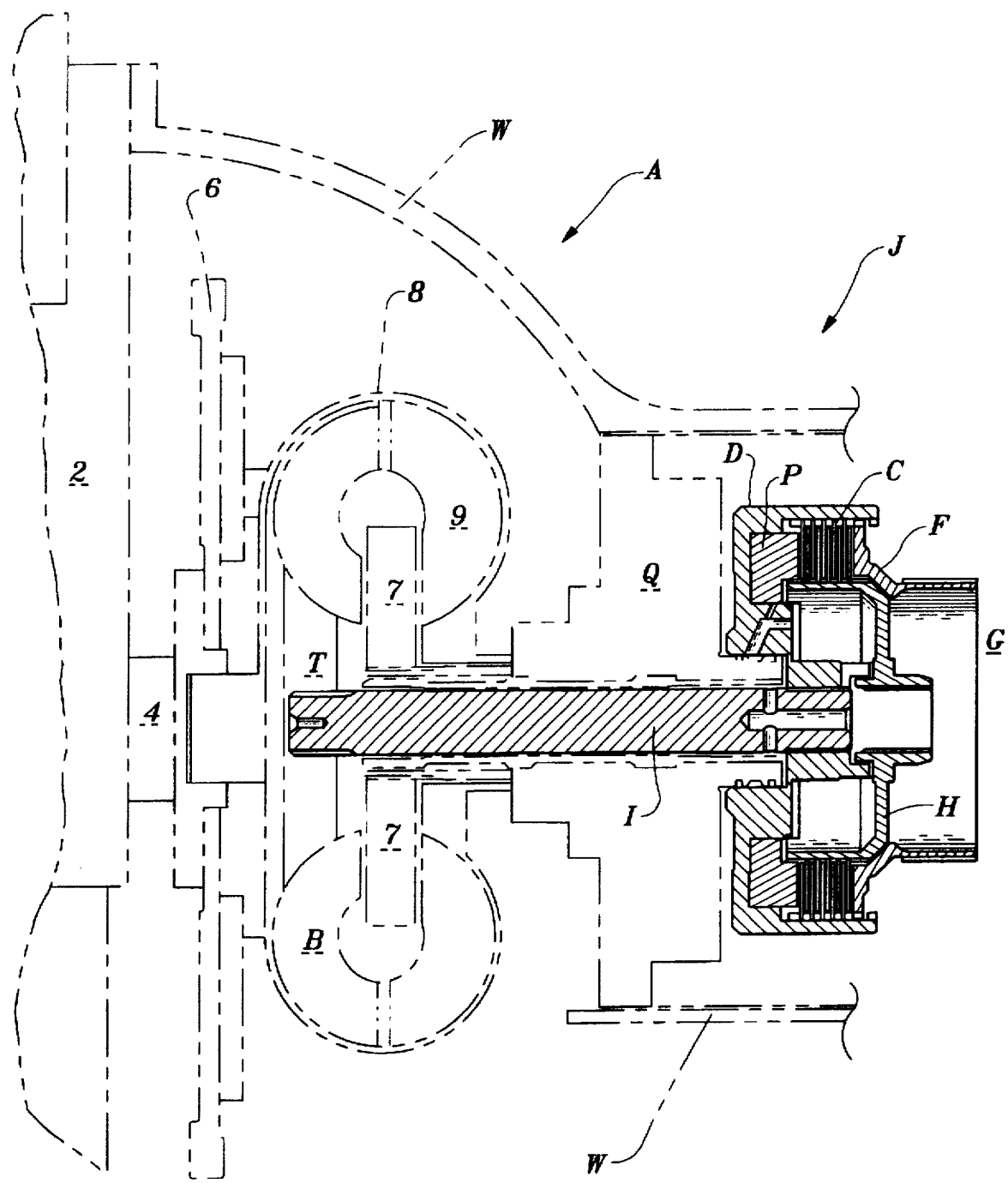
Figures 2, 3:
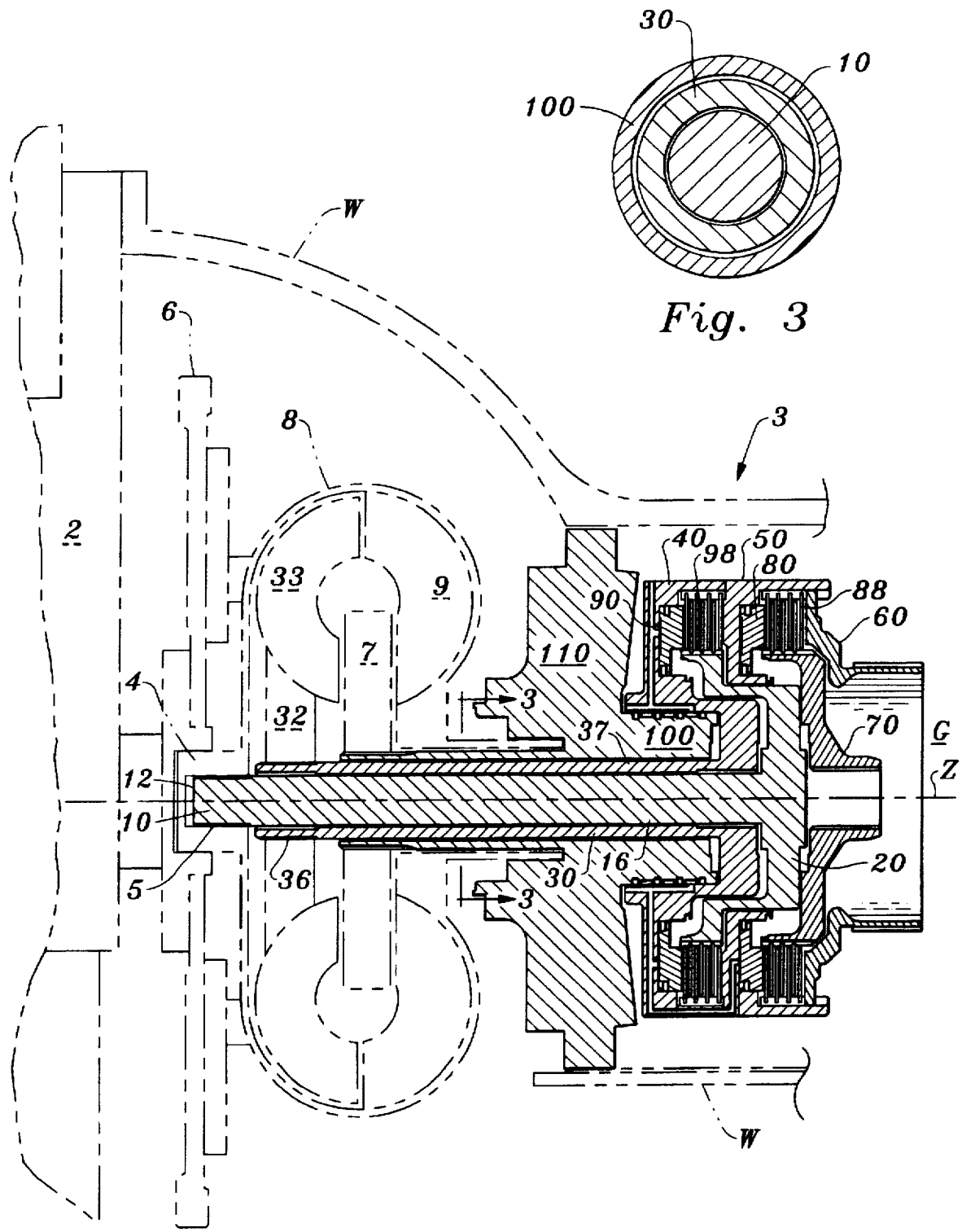
FIG. 2 is a full sectional view of that which is shown in FIG. 1 with the modifications of this invention, shown in solid lines replacing portions of the turbo hydramatic transmission.
FIG. 3 is a sectional view taken along line 3—3 of FIG. 2 and revealing how a lockup shaft and drive tube of this invention are nested together.

With reference to the drawings, FIG. 1 reveals a prior art Turbo-400 hydramatic transmission A and particularly the forward clutch drum assembly J thereof oriented adjacent an engine 2. FIG. 2 reveals the modification of this Turbo-400 hydramatic transmission and particularly a modified modified forward clutch drum assembly 3 adjacent the vehicle engine 2. The modified forward clutch drum assembly 3 features a lockup shaft 10 which is directly mechanically coupled to the pilot hub of the torque converter housing 8 which is coupled to crankshaft 4. The modified forward clutch drum assembly 3 can be mechanically locked to the crankshaft 4 when desired, unlike the forward clutch assembly J of the prior art Turbo-400 hydramatic transmission A (FIG. 1).

To better understand the features of this invention, a description of the main features of the torque converter, pump assembly Q, and fluid clutch drum assembly J of the prior art Turbo-400 hydramatic transmission are provided (FIG. 1). The Turbo-400 hydramatic transmission A is interposed between an engine 2 and the gear box G to provide transfer of power from the engine 2 to the wheels of a vehicle. Power is outputted from the engine 2 through rotation of the crankshaft 4. The torque converter 8 is coupled to a flex-plate 6 which acts as a fly wheel stabilizing the rotation of the crankshaft 4. A torque converter housing 8 is attached to the flex-plate 6 such that the torque converter housing 8 rotates along with the flex-plate 6 and crankshaft 4. The torque converter housing 8 included blades of a torque converter pump 9 upon a portion of an interior surface of the torque converter housing 8.

The torque converter pump 9 only fills approximately half of the torque converter housing 8. Also enclosed within the torque converter housing 8 is a stator 7 which is connected to the stator support pump housing Q via a sprag clutch which limits rotation of the stator 7 to one direction only. The stator support and front pump Q are fixed in position by being coupled to a fixed enclosure wall W which is the transmission outer case. The stator 7 is allowed to be locked under certain conditions and allowed to rotate along with the torque converter pump 9 under other conditions.

A turbine T having blades B is also oriented within the torque converter housing 8. The turbine T is caused to rotate along with the torque converter pump 9 because fluid within the torque converter housing 8 provides a coupling between the torque converter pump 9 and the turbine T, causing the turbine T to rotate. Because the coupling is fluid only, the turbine T does not match the speed of the torque converter pump 9, but rather lags by varying amounts at different stages of automatic transmission A operation.

The turbine T is securely fixed to an input shaft I which is colinear with the crankshaft 4, but does not quite match the speed of the crankshaft 4 due to the fluid coupling within the torque converter housing 8. The input shaft I is supported by the stator support front pump assembly Q which is bored out to allow the input shaft I to pass there through. The input shaft I is secured to a forward drum D which is also secured to a direct clutch hub F. A forward hub H is nested within the forward clutch drum assembly J between the forward drum D and the direct clutch hub F. The forward hub H does not rotate along with the input shaft I, forward drum D and direct clutch hub F unless a piston P, oriented within the forward drum D, is applied against clutch plates C, causing the forward hub H to be locked with relationship to the forward drum D.

Displacement of the piston P to its applied position is caused by hydraulic fluid being supplied with sufficient pressure against the piston P by the front pump Q to cause the piston P to move against the clutch plates C. When this occurs, the forward hub H is caused to rotate along with the input shaft I. However, the input shaft I does not rotate along with the crankshaft 4 of the engine 2. Again, this difference in speed between the engine 2 and the input shaft I is caused by the fluid coupling within the torque converter housing 8, and the lack of a mechanical coupling between the crankshaft 4 and the forward clutch drum assembly J.

The forward hub H is coupleable to different portions of the gear box G which includes planetary gears therein and other gears to alter the speed and torque which is directed along the drive train to wheels of the vehicle.

The pump assembly Q provides high pressure fluid when needed to move the piston P within the forward clutch drum assembly J. The pump assembly Q also provides support for the shaft I and the stator 7.

In essence, and with particular reference to FIGS. 2–5, details of the modified modified forward clutch drum assembly 3 of this invention are described. By way of introduction, it is noted that portions of FIG. 2 shown in phantom lines are similar to those features which are exhibited by the prior art Turbo-400 hydramatic transmission A, shown in FIG. 1. Hence, these features will not be further described except where they differ from the prior art Turbo-400 hydramatic transmission A and forward clutch drum assembly J of the prior art.

In this invention, the crankshaft pilot hub of the torque converter housing 8 is slightly modified to include a splined blind bore 5 therein. This splined blind bore 5 is configured to receive a lockup shaft 10 with splines 13 (FIG. 6) to secure the lockup shaft 10 to the crankshaft pilot hub of the torque converter housing 8. The lockup shaft 10 is not coupled directly to the turbine T (FIG. 1), but rather extends to the modified forward clutch drum assembly 3 where it is secured to a lockup hub 20.

A drive tube 30 is provided which is hollowed out and surrounds the lockup shaft 10. The drive tube 30 effectively replaces the input shaft I (FIG. 1) of the prior art. The drive tube 30 is thus coupled to a torque converter turbine 32 having blades 33 thereon residing within the torque converter housing 8. The drive tube 30 extends to the modified forward clutch drum assembly 3 where it is secured to the lock-up drum 40 and forward drum 50, as well as the direct hub 60. Thus, the lock-up drum 40, forward drum 50, and direct hub 60 always rotate together along with the drive tube 30 which is coupled to the torque converter turbine 32 and fluidly coupled to the torque converter pump 9. In contrast, the lockup hub 20 is coupled to the lockup shaft 10 which is directly coupled mechanically to the crankshaft pilot hub of the torque converter housing 8.

A forward clutch hub 70 in the modified forward clutch drum assembly 3 can be caused to rotate along with the drive tube through the lock-up drum 40, forward drum 50, and direct hub 60 by applying hydraulic fluid under pressure against the forward piston 80. The hydraulic pressure is provided by the front pump assembly 110 which replaces the front pump assembly Q of the prior art (FIG. 1).

When lockup of the modified forward clutch drum assembly 3 directly to the crankshaft 4 of the engine 2 is desired, hydraulic fluid is allowed to apply a lockup piston 90, causing the lockup hub 20 to rotate with the lock-up drum 40, forward drum 50, direct hub 60, and forward clutch hub 70. Because the lockup shaft 10 is directly coupled to the crankshaft pilot hub of the torque converter housing 8, when the lockup piston 90 is applied the forward clutch hub 70 is caused to rotate at the same speed as the crankshaft 4 of the engine 2, without any slippage which would otherwise occur within the torque converter housing 8. Hence, the torque converter pump 9 and torque converter turbine 32 are caused to rotate together and no power is transmitted there between, but rather all power is transmitted along the lockup shaft 10.

As with the prior art forward clutch drum assembly J, the modified forward clutch drum assembly 3 of this invention supplies power to the gear box G through the direct hub 60 or forward clutch hub 70.

More specifically, and with particular reference to FIGS. 2, 3, and 6, details of the lockup shaft 10 are provided. The lockup shaft 10 is a solid rigid cylindrical rod having a flat input end 12 parallel to and spaced from a flat output end 16. Splines 13 are oriented adjacent the input end 12 and the output end 16. A cylindrical surface 18 defines a periphery of the lockup shaft 10 between the input end 12 and the output end 16. The splines 13 are sized to mesh with the splined blind bore 5 of the crankshaft pilot hub of the torque converter housing 8. The lockup shaft 10 is oriented with the input end 12 nested within the splined blind bore 5, such that the lockup shaft 10 rotates with the crankshaft 4 and engine 2 at all times. The output end 16 can be configured with splines or a different attachment means, so long as the lockup hub 20 is securely fixed to the output end 16 of the lockup shaft 10.

With particular reference now to FIGS. 2, 4, 5, 8, and 9, details of the lockup hub 20 are provided. The lockup hub 20 is a solid rigid construct which is generally annular and radially symmetrical about a central axis Z. The lockup hub 20 includes a shaft attachment bore 21 surrounding the central axis Z. The shaft attachment bore 21 has a diameter similar to a diameter of the output end 16 of the lockup shaft 10. The shaft attachment bore 21 is securely attached to the output end 16 of the lockup shaft 10, such that the lockup hub 20 rotates with the lockup shaft 10, and hence the engine crankshaft 4, at all times.

The lockup hub 20 includes a perimeter 22 which has a plurality of outward facing clutch splines 23 extending therefrom. The clutch splines 23 are configured with a series of humps and troughs which can mesh with splines on clutch plates, such as the lockup clutch plates 98 (FIG. 2), for securing of the lockup hub 20 to other portions of the modified forward clutch drum assembly 3 when desired. The lockup hub 20 includes an input side 24 which is recessed slightly adjacent the perimeter 22 and recessed more greatly adjacent the shaft attachment bore 21. A step 26 provides a transition between the two depths of recess into the input side 24. An output side 25 of the lockup hub 20 generally parallels the input side 24, such that the lockup hub 20 has a generally constant thickness.

The contour of the lockup hub 20 between the input side 24 and output side 25 and the dimensions of the perimeter 22 are selected to allow the lockup hub 20 to mesh between the forward drum 40 and direct drum 50 and the forward clutch hub 70, so that the lockup hub 20 can freely rotate without impacting these adjacent structures even if they are rotating at different speeds.

With reference to FIGS. 2–5 and 7, details of the drive tube 30 are described. The drive tube 30 is a rigid cylindrical tube having an outside surface 34 parallel to an inside surface 35. The inside surface 35 is sized to overlie the lockup shaft 10 therein. The drive tube extends linearly from a first end 36 to a second end 37. The first end supports the turbine 32 thereon, preferably through splines 31. The second end 37 is coupled securely to the lock-up drum 40. The drive tube 30 has sufficient thickness between the surfaces 34, 35 to transmit torque from the turbine 32 to the forward drum 40 without failure.

With reference to FIGS. 2, 4, 5, and 10–12, details of the lock-up drum 40 are described. The lock-up drum 40 is a rigid construct which is generally annular and generally radially symmetrical about the central axis Z. The lock-up drum 40 includes a journal bore 41 surrounding the central axis Z. The lock-up drum 40 includes a periphery 42 which is circular and includes inward facing clutch splines 43 thereon.

The inward facing clutch splines 43 are similar to the outward facing clutch splines 23 of the lockup hub 20, except that the inward facing clutch splines 43 secure to the lockup clutch plates 98 on an opposite outer side of the lockup clutch plates 98 while the outward facing clutch splines 23 of the lockup hub 20 secure to an inner edge of the lockup clutch plates 98. Each lockup clutch plate 98 is either coupled to the outward facing clutch splines 23 or to the inward facing clutch splines 43, but not both, preferably in an alternating pattern, such that when pressure is applied to the clutch plates 98 by the lockup piston 90, the lockup clutch plates 98 can be securely attached together and cause the lock-up drum 40 to rotate with the lockup hub 20, through action of the lockup clutch plates 98 upon the clutch splines 23, 43 of the lockup hub 20 and lock-up drum 40, respectively.

The lock-up drum 40 includes a pump side 44 generally defining one side of the lock-up drum 40 and a clutch side 45 opposite the pump side 44. The clutch side 45 is adjacent to the input side 24 of the lockup hub 20 and the pump side 44 is adjacent the forward pump 110.

Enough space is provided between the clutch side 45 and the pump side 44 to include drive fluid channels 48 and lockup fluid channels 49 passing between a cylindrical recess 47 forward in the pump side 44 and various different points beyond the lock-up drum 40. The drive fluid channels 48 pass through to the forward drum 50 and then to a position where they can apply the forward piston 80. The lockup fluid channels 49 pass through to the clutch side 45 of the lock-up drum 40, adjacent where the lockup piston 90 resides, so that high pressure fluid can be provided adjacent the lockup piston 90 for application of the lockup piston 90.

With particular reference to FIGS. 2, 4, 5, and 13–15, details of the forward drum 50 of the modified forward clutch drum assembly 3 are provided. The forward drum 50 is a rigid generally annular construct which is radially symmetrical about a central axis Z. The forward drum 50 includes a collar 51 defining an inner diameter of the annular forward drum 50. The forward drum 50 includes a circular outer surface which supports a plurality of inner clutch splines 53 facing inward toward the collar 51. The forward drum 50 includes a forward side 54 oriented adjacent the lockup hub 20 and a rearward side 55 adjacent the forward piston 80, direct hub 60, and forward clutch hub 70.

The forward drum 50 includes threaded bolt holes 56 adjacent the outer surface 52. The threaded bolt holes 56 are arranged to align with bolt holes 46 forward near the periphery 42 of the lock-up drum 40. Threaded bolts can be utilized through the threaded bolt holes 56 and bolt holes 46 to secure the lock-up drum 40 and forward drum 50 together.

At least two drive fluid outlets 58 are provided passing from the outer surface 52 of the forward drum 50, adjacent the forward side 54, to the rearward side 55 at a location adjacent where the forward piston 80 resides. These drive fluid outlets 58 are oriented to align with the drive fluid channels 48 of the lock-up drum 40, such that when the forward drum 50 and lock-up drum 40 are bolted together, fluid can pass from the drive fluid channels 48 through to the drive fluid outlets 58 within the forward drum 50. Fluid exiting the drive fluid outlets 58 can then apply the forward piston 80, causing the forward clutch hub 70 to rotate with the forward drum 50 and lock-up drum 40.

With particular reference to FIGS. 2, 4, 5, 16 and 17, details of the direct hub 60 are provided. The direct hub 60 is a solid rigid construct which is generally annular and radially symmetrical about the central axis Z. The direct hub 60 includes an inner surface 61 facing the central axis Z and an annular flange 62 extending away from the central axis Z. The annular flange 62 is adjacent a front side 64 of the direct hub 60 which is adjacent the forward clutch plates 88 and the forward clutch hub 70 and is opposite the second side 65. The second side 65 extends away from the torque converter housing 8 and engine 2 and defines a portion of the transition between the modified forward clutch drum assembly 3 and the gear box G. The second side 65 transitions into the cylindrical inner surface 61 with hub splines 63 extending on a side of the second side 65 opposite the inner surface 61. The hub splines 63 thus extend away from the central axis Z. The hub splines 63 can interface with portions of the gear box G, particularly those portions of the gear box G which can cause the wheels of the vehicle to rotate in reverse.

The annular flange 62 supports a plurality of drum splines 66 extending outward away from a tip of the annular flange 62. The drum splines 66 are sized and spaced such that they securely mesh with the inner clutch splines 53 of the forward drum 50. Thus, the direct hub 60 is caused to rotate with the forward drum 50 at all times. The direct hub 60 includes a beveled wall 67 which angles the annular flange 62 out away from the other portions of the direct hub 60 and provides clearance to allow the direct hub 60 to overlie the forward clutch hub 70 and avoid impacting the forward clutch hub 70. The first side 64 of the direct hub 60 provides a surface against which the forward clutch plates 88 can be compressed when the forward piston 80 is applied. Some of the forward clutch plates 88 are splined along with the forward clutch hub 70, such that when the forward piston 80 is applied, the forward clutch hub 70 is caused to rotate along with the direct hub 60, forward drum 50, and lock-up drum 40.

With particular reference to FIGS. 2, 4, 5, 18 and 19, details of the forward clutch hub 70 are provided. The forward clutch hub 70 is a rigid generally annular construct which is radially symmetrical about the central axis Z. The forward clutch hub 70 includes a gear box interface bore 71 which has bore splines 72 thereon which can interface with portions of the gear box G. When the forward clutch hub 70 rotates along with other portions of the modified forward clutch drum assembly 3, power from the engine is transferred to the gear box G through this gear box interface bore 71, except when the vehicle is operating in reverse.

The forward clutch hub 70 includes an outer cylindrical surface 73 defining a periphery of the forward clutch hub 70. The outer cylindrical surface 73 supports a plurality of outer clutch splines 74 thereon. The forward clutch hub 70 includes a front side 76 which is oriented adjacent the output side 25 of the lockup hub 20 and a back side 77 opposite the front side 76 and adjacent portions of the direct hub 60. The outer clutch splines 74 of the forward clutch hub 70 interface with some of the forward clutch plates 88, such that the forward clutch hub 70 is caused to rotate with the lock-up drum 40, forward drum 50, and direct hub 60 when the forward piston 80 is applied against the forward clutch plates 88.

With reference to FIGS. 2, 4, 5, 20 and 21, details of the forward piston 80 and lockup piston 90 are provided. Preferably, the forward piston 80 and lockup piston 90 are identical in structure. The forward piston 80 is an annular rigid plate having an apply side 82 parallel to and spaced from a clutch side 83. An outer edge 84 of the forward piston 80 defines a periphery of the forward piston 80 and an inner edge 85 defines an inner extent of the forward piston 80. The forward piston 80 is radially symmetrical about the central axis Z. The forward piston 80 includes an outer slot 86 and an inner slot 87. The slots 86, 87 can support 0-rings or other types of seals therein to prevent fluid on one side of the piston 80 from passing around the piston 80.

The forward piston 80 is oriented between the rearward side 55 of the forward drum 50 and the first side 64 of the direct hub 60. Because the drive fluid outlets 58 pass out of the rearward side 55 of the forward drum 50, when high pressure fluid exits the drive fluid outlets 58, the forward piston 80 is caused to move away from the rearward side 55 of the forward drum 50 and toward the first side 64 of the direct hub 60. The forward clutch plates 88, between the forward piston 80 and the direct hub 60, are caused to be compressed together and rotate together. This in turn causes the forward clutch hub plate 70 to rotate along with the direct hub 60 and forward drum 50 when the forward piston 80 is applied.

The lockup piston 90, having similar structural features to the forward piston 80, is located between the lock-up drum 40 and the lockup hub 20. Specifically, the lockup piston 90 has an applied side thereof oriented adjacent the clutch side 45 of the lock-up drum 40 and the clutch side of the lockup piston 90 oriented adjacent the lockup clutch plates 98. The lockup clutch plates 98 in turn are oriented between the lockup piston 90 and the forward drum 50. The lockup clutch plates 98 are alternatively splined with the lockup hub 20 and the lock-up drum 40. Because the lockup piston 90 is adjacent the clutch side 45 of the lock-up drum 40 and the lockup fluid channels 49 exit out of the clutch side 45 of the lock-up drum 40, when hydraulic fluid passes through the lockup fluid channels 49 at high pressure, the lockup piston 90 is caused to move away from the lock-up drum 40, compressing the lockup clutch plates 98 and causing the lockup hub 20 to rotate with the lock-up drum 40, forward drum 50, and direct hub 60.

Because the lockup hub 20 is securely attached to the crankshaft pilot hub of the torque converter housing 8, through the lockup shaft 10, this inter-coupling of the lockup hub 20 with the lock-up drum 40, forward drum 50, and direct hub 60 causes the lockup hub 20 to increase rotational speed of the lock-up drum 40, forward drum 50, and direct hub 60, rather than merely decreasing the speed of the lockup hub 20. Stated alternatively, once the lockup hub 20 is caused to rotate with the lock-up drum 40, both the lockup shaft 10 and drive tube 30 are caused to rotate together and the torque converter pump 9 and torque converter turbine 42 are caused to rotate together, such that the torque converter pump 9 is no longer actively providing a fluid coupling between the engine and the modified forward clutch drum assembly 3, but rather has been bypassed.

Figure 22:
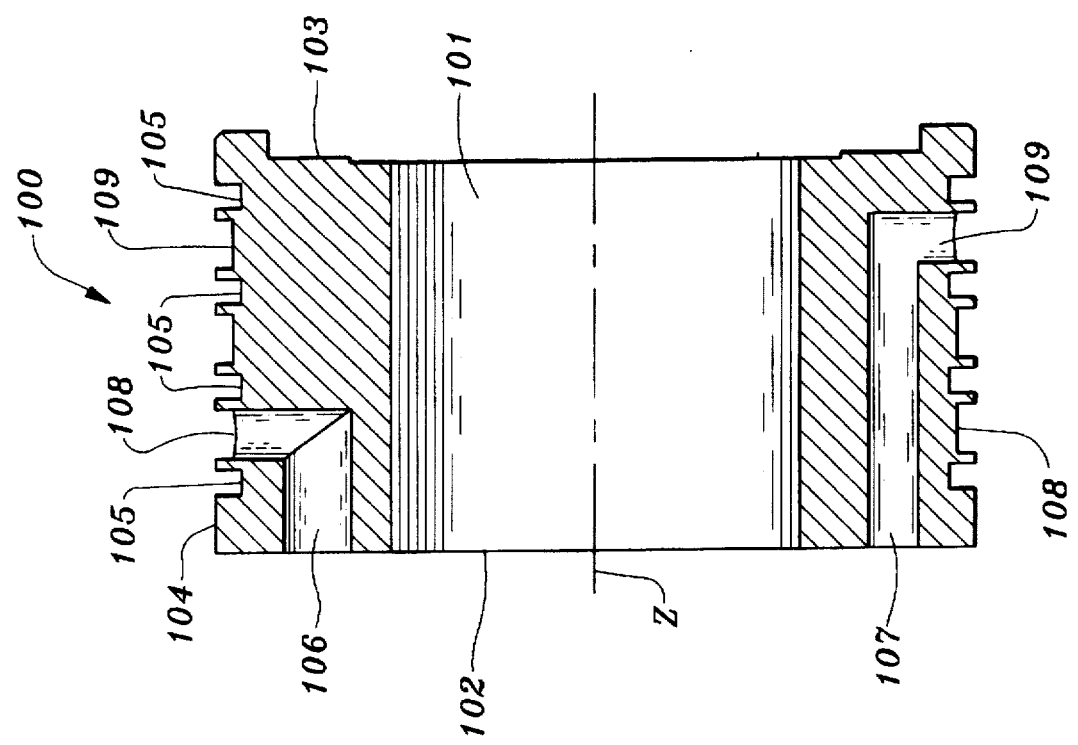
FIG. 22 is a sectional view taken along lines 22—22 of FIG. 23 and revealing interior details of the stator hub of this invention.
Figure 23:
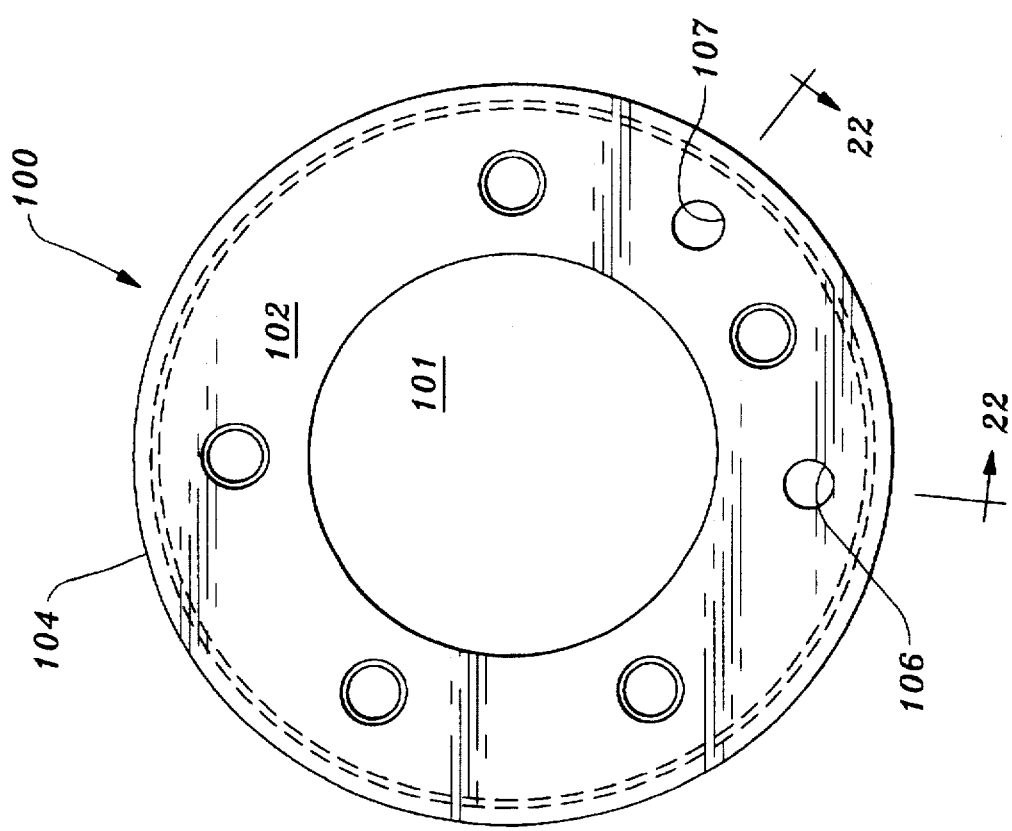
FIG. 23 is a front elevation view of the stator hub of this invention.

With reference to FIGS. 22 and 23, details of the stator hub 100 are described. The stator hub 100 is a solid generally cylindrical construct which is primarily radially symmetrical, but with some asymmetrical features. The stator hub 100 includes a tube support bore 101 passing entirely from an attached end 102 to a free end 103. The attached end 102 is attached to the front pump assembly 110, such that the stator hub 100 is stationary with respect to the engine 2, wall W, and pump assembly 110. The free end 103 is not connected to any other structures but is generally adjacent to the pump side 44 of the lock-up drum 40. The stator hub 100 includes an outer wall 104 generally parallel to the tube support bore 101 and defining a periphery of the stator hub 100. The outer wall 104 is adjacent to the cylindrical recess 47 of the lock-up drum 40.

The stator hub 100 includes a drive fluid pathway 106 which is oriented parallel to the central axis and between the tube support bore 101 and the outer wall 104 and passing only partially from the attached end 102 to the free end 103. A drive fluid port 108 extends from the drive fluid pathway 106 out to the outer wall 104, at a location on the outer wall 104 which is adjacent to the drive fluid channels 48 in the lock-up drum 40, such that drive fluid can pass from the pump 110 through the stator hub 100, through the drive fluid pathway 106, through the drive fluid port 108 and into the drive fluid channels 48 within the lock-up drum 40. Seal slots 105 are provided on opposite sides of the drive fluid ports 108, to provide a dynamic seal between the stationary stator hub 100 and the rotating lock-up drum 40.

A lockup fluid pathway 107 similar to the drive fluid pathway 106 is provided extending from the attached end 102 down into the stator hub 100 between the tube support bore 101 and the outer wall 104. The lockup fluid pathway 107 extends further into the stator hub 100 than does the drive fluid pathway 106. A lockup fluid port 109 is provided extending from the lockup fluid pathway 107 out to the outer wall 104 of the stator hub 100 at a location adjacent the lockup fluid channels 49 of the forward pump 40. Seal slots 105 are oriented on opposite sides of the lockup fluid port 109 to provide a dynamic seal between the stator hub 100 and the lock-up drum 40 adjacent the lockup fluid port 109. Thus, hydraulic fluid can pass from the pump 110, through the stator hub 100, through the lockup fluid pathway 107, through the lockup fluid port 109 and into the lockup fluid channels 49 within the lock-up drum 40.

The stator hub 100 can also support the stator 7 within the torque converter housing 8 through a stator support tube secured to the stator hub 100 and extending toward the engine 2, while surrounding the drive tube 30. In this way, the stator 7 can be held without motion relative to the engine 2 and the pump assembly 110 within the torque converter housing 8 when desired (see FIGS. 2 and 3). A free wheel device can be oriented between the stator hub 100 and the stator 7, to allow the stator 7 to rotate under certain conditions within the torque converter housing 8. Preferably, the stator hub 100 is attached to the pump assembly 110 through both holes passing through the stator hub 100 from the attached end 102 to the free end 103.

With particular reference to FIG. 2, details of the pump assembly 110 are provided. The pump assembly 110 serves a similar purpose to the front pump assembly Q of the prior art (FIG. 1). However, a size of the pump assembly 110 has been decreased slightly to match an overall length of the torque converter and modified forward clutch drum assembly 3 to that of the torque converter and forward clutch assembly J of the prior art, facilitating replacement of parts of the prior art transmission with the structure disclosed in this invention.

The pump assembly 110 is preferably formed from two separate plates that are sandwiched together and have pathways therein through which hydraulic fluid can pass. Certain of these pathways are provided for cooling of the hydraulic fluid. Certain of these pathways are provided to direct high pressure fluid to the drive fluid channels 48, and pathways 136 are provided to direct high pressure fluid to the lockup fluid channels 49 of the forward drum 40, to cause the pistons 80, 90 to be applied as desired. Also within the pump 110 or adjacent thereto, a solenoid is provided to allow for manual control of the application of the lock-up piston 90, if desired. Finally, return lines are provided within the pump assembly 110 and pumping means is provided within the pump assembly 110 to circulate hydraulic fluid through the various different pathways within the pump assembly 110.

In essence, the function of the pump assembly 110 is analogous to that of the front pump assembly Q of the Turbo-400 hydramatic transmission, except that the additional fluid pathway for the lockup piston 90 is provided and the pump assembly 110 is reconfigured to be thinner than the pump assembly Q so that the pump assembly 110 and assembly 3 can fit in the same space as the front pump assembly Q and assembly J.

Figure 4:
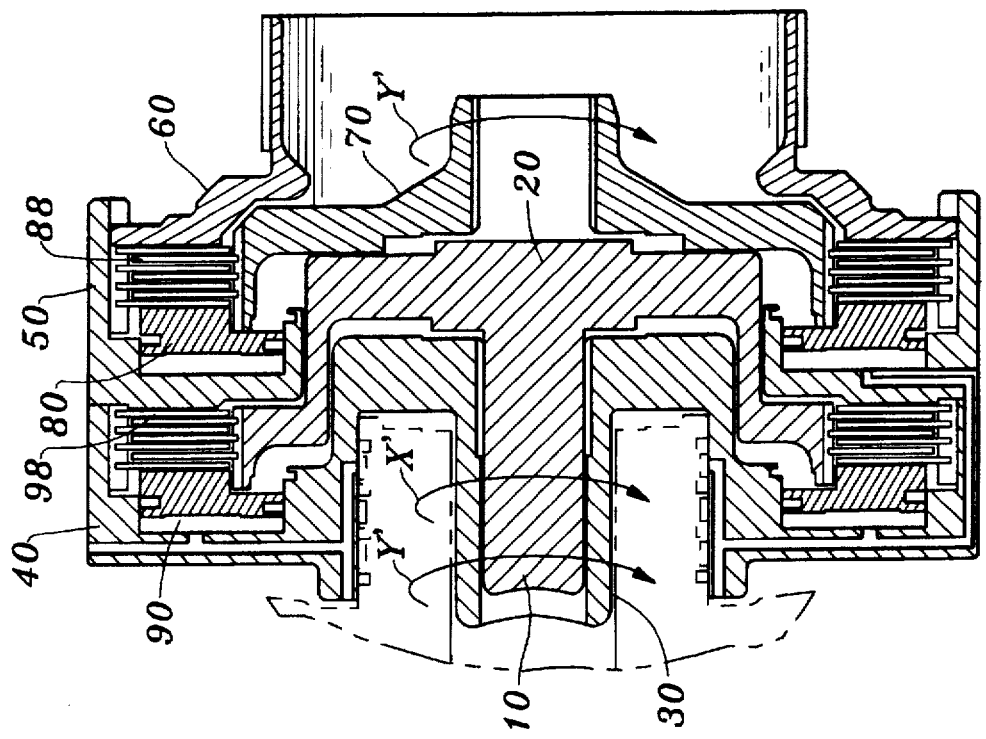
FIG. 4 is a full sectional view of the modified forward clutch drum assembly of this invention when the forward piston and forward clutch are applied and locked to the forward drum and lock-up drum, but with the lockup clutch not engaged.
Figure 5:
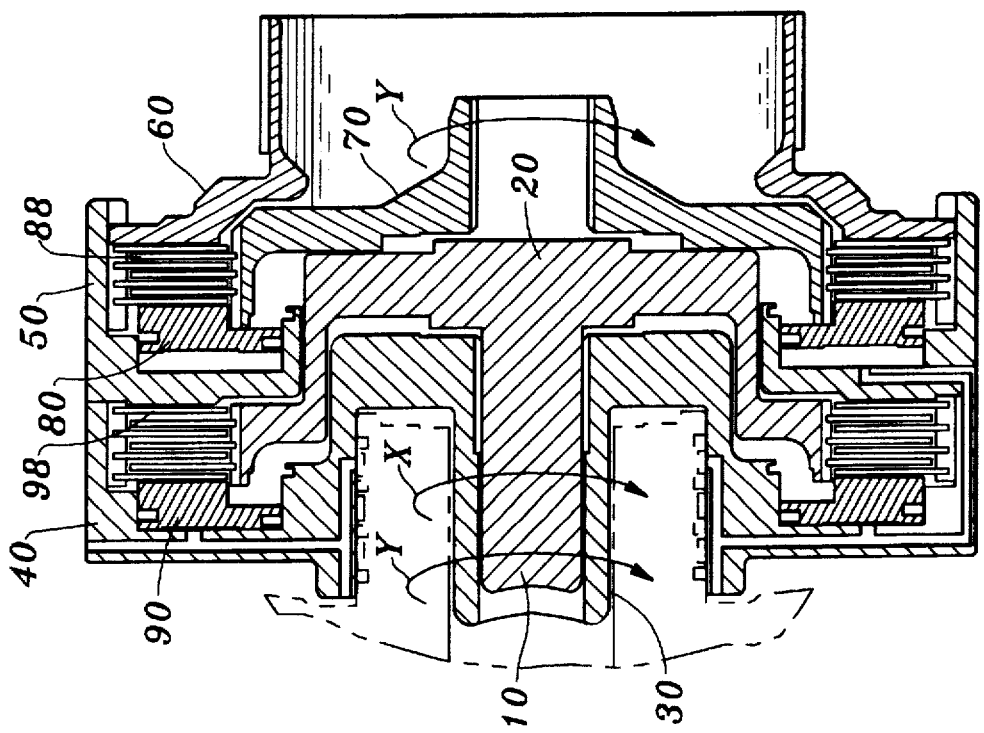
FIG. 5 is a full sectional view similar to that which is shown in FIG. 4 but with both the forward piston and the lockup piston applied, such that the lockup hub and forward clutch hub are both locked to the forward drum and lock-up drum through the forward clutch plates and lockup clutch plates.
Figure 9:
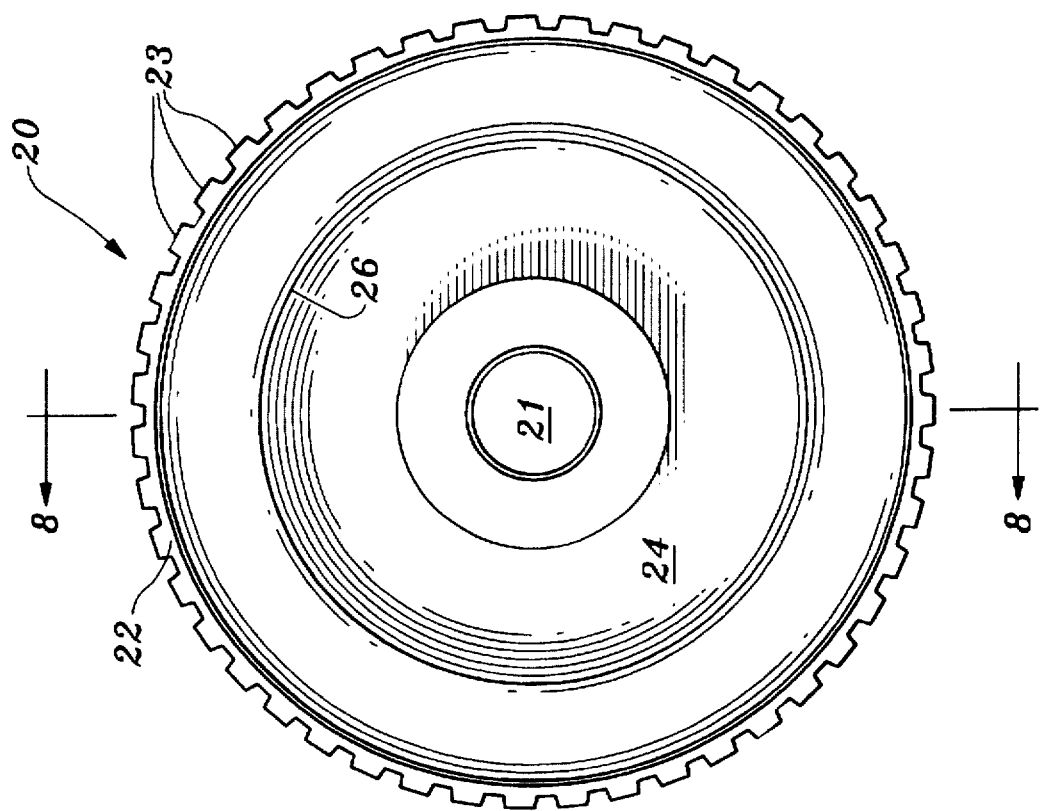
FIG. 9 is a front elevation view of the lockup hub of this invention.
Figure 8:
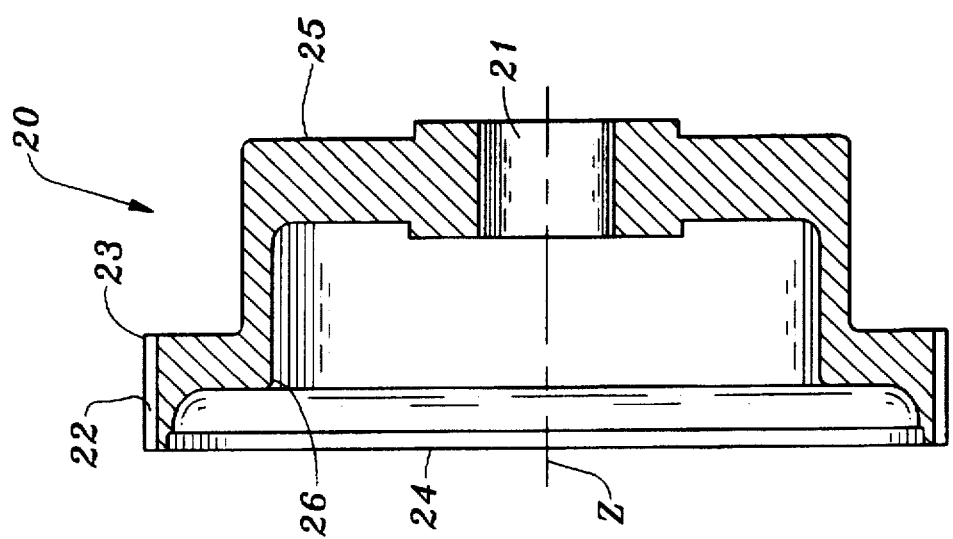
FIG. 8 is a full sectional view of the lockup hub of this invention, the view taken along lines 8—8 of FIG. 9.
Figures 10, 11, 12:
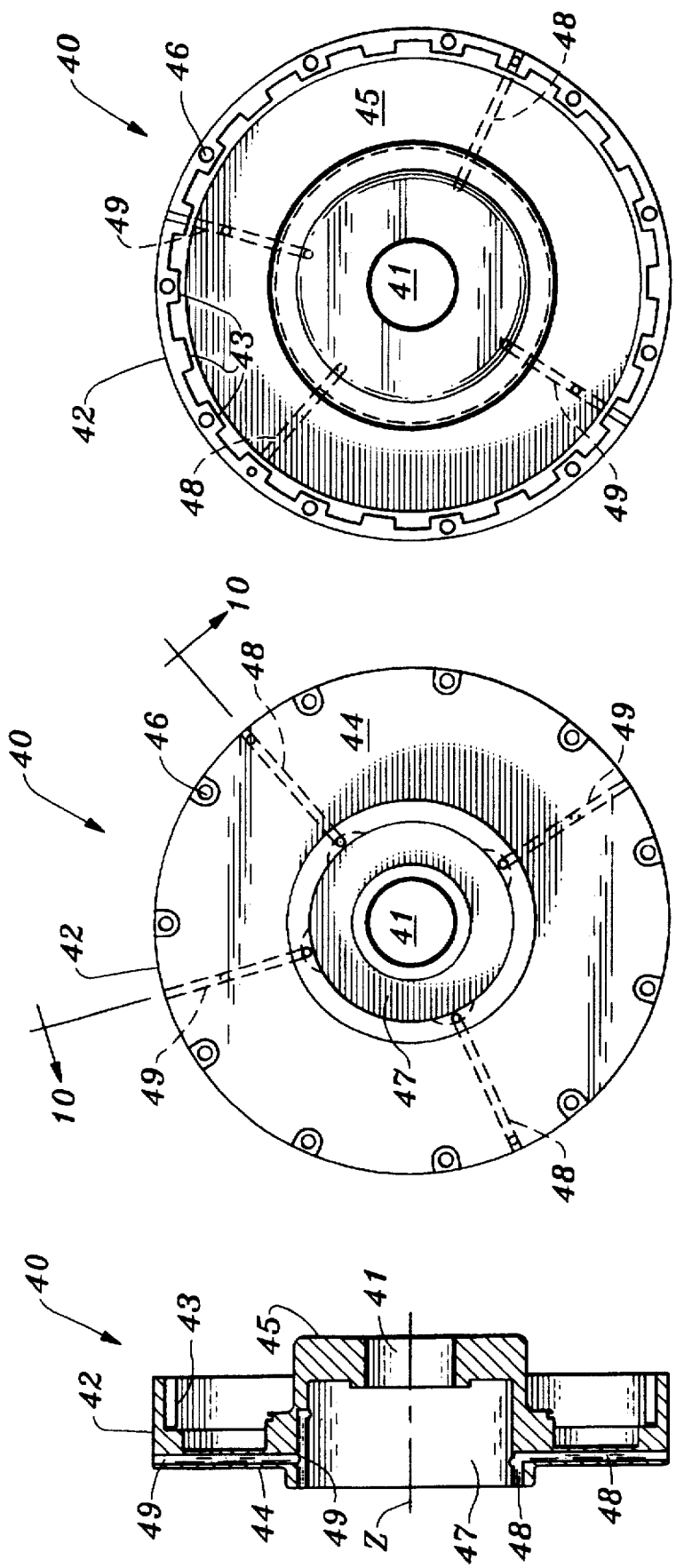
FIG. 10 is a sectional view taken along lines 10—10 of FIG. 11 revealing interior details of a lock-up drum of this invention.
FIG. 11 is a front elevation view of the lock-up drum of this invention.
FIG. 12 is a rear elevation view of the lock-up drum of this invention.
Figures 18, 19:
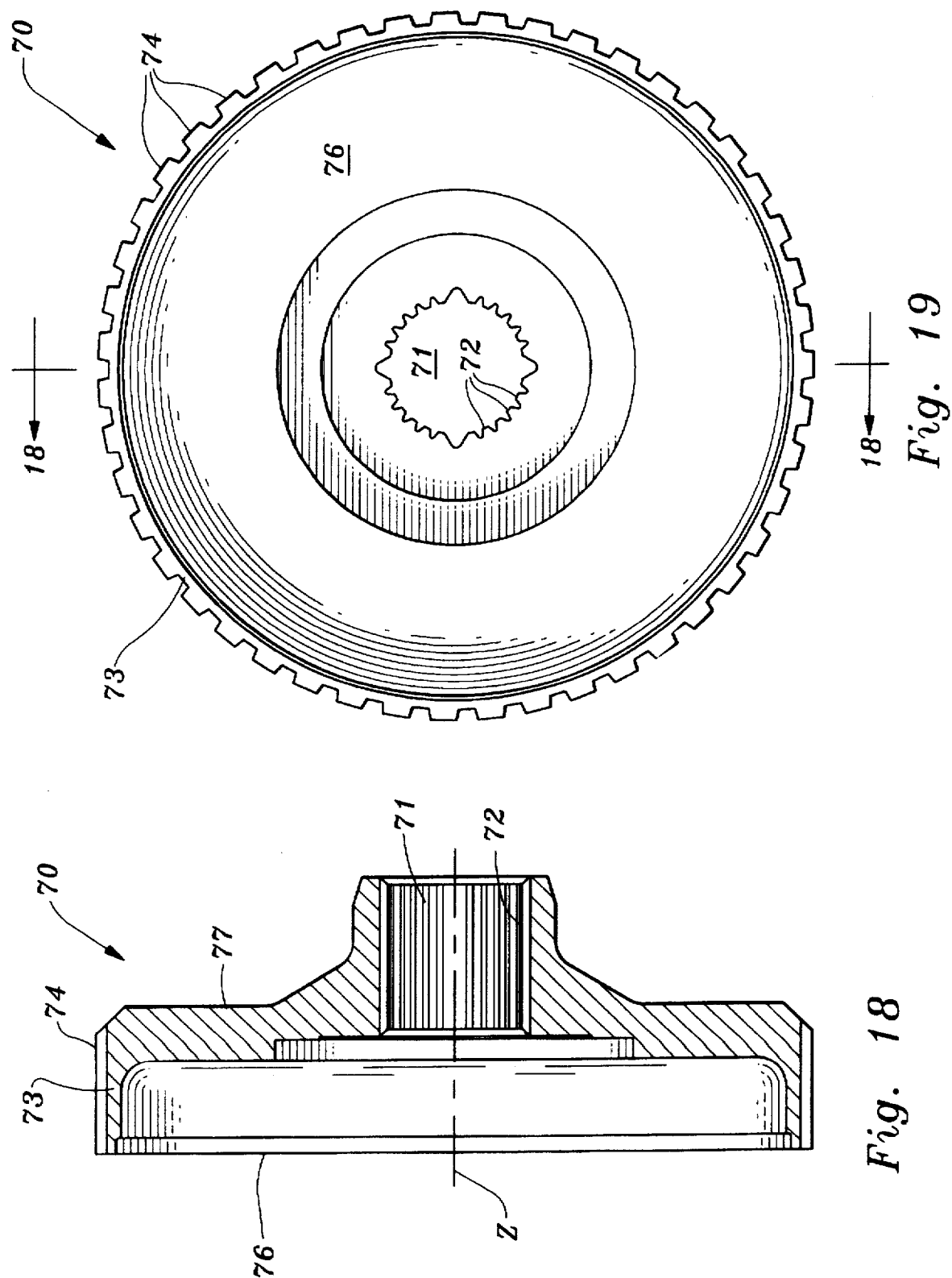
FIG. 18 is a full sectional view of the forward clutch hub of this invention, taken along lines 18—18 of FIG. 19.
FIG. 19 is a front elevation view of the forward clutch hub of this invention.

With reference now to FIGS. 2, 4 and 5, details of the operation of this invention are provided. Initially, when the vehicle engine 2 is not running, all of the different elements of this invention are at rest. When the engine 2 is started, the crankshaft 4 is caused to rotate. This in turn causes the lockup shaft 10 and lockup hub 20 to rotate. Also, the flex plate 6 and torque converter housing 8, along with the torque converter pump 9 are caused to rotate.

Other portions of the invention are initially at rest. However, as soon as the torque converter pump 9 begins to rotate, fluid within the torque converter housing 8 causes the torque converter turbine 32 to rotate within the torque converter housing 8. This in turn causes the drive tube 30 to rotate along with the lock-up drum 40, forward drum 50, and direct hub 60 which all attach together. Because only a fluid coupling is provided between the torque converter pump 9 and the torque converter turbine 32, there is initially a large speed differential and later a lesser speed differently between the lockup shaft 10 and the drive tube 30 and between the lockup hub 20 and the other portions of the modified forward clutch drum assembly 3.

When a driver of the vehicle desires to move the vehicle, the transmission is manually manipulated, typically moving a lever, to cause the transmission to go from a selection such as park or neutral to a drive position. When this occurs, the pump assembly 110 delivers high pressure fluid into the stator hub 100, along the drive fluid pathway 106, through the drive fluid port 108, into the drive fluid channels 48 of the lock-up drum 40 to the drive fluid outlets 58 of the forward drum 50 and out the rearward side 55 of the forward drum 50 and against the forward piston 80. The forward piston 80 is then caused to move away from the forward drum 50 and causes the forward clutch plates 88 to be sandwiched between the forward piston 80 and the direct hub 60. At this point, the forward clutch hub 70, which had previously been at rest, is caused to rotate along with the lock-up drum 40, forward drum 50, direct hub 60 and the drive tube 30.

Because the forward clutch hub 70 is coupled through the gear box G to other portions of the drive train and wheels of the vehicle, the vehicle is caused to begin motion. When the vehicle is initially beginning motion and is accelerating, the momentum and friction within the drive train and the wheels and the vehicle itself provide a great load on the forward clutch hub 70. Hence, the forward clutch hub 70 does not immediately attain the desired speed, rather the lock-up drum 40, forward drum 50, and direct hub 60 are slowed down to a much slower speed which matches that of the forward clutch hub 70, but causes the torque converter turbine 32 within the torque converter housing 80 to slow down significantly with respect to the torque converter pump 9.

As acceleration continues, this differential between the torque converter pump 9 and the torque converter turbine 32 slowly decreases. The torque converter thus provides a smooth transition and prevents the vehicle from starting with a jerk. Also, the torque converter magnifies a torque which is applied to the forward clutch hub 70, increasing an acceleration rate for the vehicle. The transmission can then operate through the gear box G, to increase the vehicle's speed further. However, the torque converter pump 9 and the torque converter turbine 32 will never actually match speeds because of the fluid coupling there between and the load on the forward clutch hub 70. Thus, energy is wasted and a maximum speed of the vehicle is limited.

To remedy this problem, the driver of the vehicle can select that the transmission go into a "lockup mode" by selecting such performance through a lever or other switch. Alternatively, the "lockup mode" can be automatically initiated when certain criteria are met, such as the vehicle speed reaching a certain point or the RPM's of the engine reaching a certain point. When the lockup mode is initiated, then the solenoid within the pump assembly 110 causes high pressure fluid to pass from the pump assembly 110 through the stator hub 100, through the lockup fluid pathway 107, through the lockup fluid port 109, through the lockup fluid channels 49 and the lock-up drum 40 and then up to the clutch side 45 of the lock-up drum 40.

When high pressure fluid reaches the clutch side 45 of the lock-up drum 40, it causes the lockup piston 90 to be displaced away from the clutch side 45 of the lock-up drum 40 and against the lockup clutch plates 98. The lockup clutch plates 98 are then compressed together and against the forward side 54 of the forward drum 50, causing the lockup hub 20 to rotate with the lock-up drum 40. Thus, the lockup shaft 10 is also caused to rotate along with the drive tube 30. Because the lockup hub 20 and lock-up drum 40 are already rotating at a somewhat closely related speed, no significant transitional jerk is provided, rather the load on the engine is merely increased slightly before the system compensates for the transition caused by the lockup clutch plates 98 engaging the lockup hub 20 with the lock-up drum 40.

The operation of the modified forward clutch drum assembly 3 in the neutral mode, drive mode, and lockup mode are illustrated in FIGS. 2, 4 and 5 respectively. Note from FIG. 2 that neither the forward piston 80 nor the lockup piston 90 are in the applied position. In FIG. 4, the forward piston 80 has been applied but the lockup piston 90 has not been applied. Hence, the lockup shaft 10 is rotating at an angular speed represented by arrow X while the drive tube 30 and the forward clutch hub 70 are rotating at an angular speed represented by arrow Y. In the case shown in FIG. 4, angular speed X is greater than angular speed Y and some loss of efficiency exists.

In contrast, in FIG. 5, both the forward piston 80 and the lockup piston 90 are applied, causing the lockup hub 20 to rotate along with the lock-up drum 40, forward drum 50, direct hub 60, and forward clutch hub 70. Thus, the angular speed of the lockup shaft 10 represented by arrow X' is equal to the angular velocity represented by the drive tube 30 by the arrow Y' and is equal to the angular speed of the forward clutch hub 70 represented by the arrow Y'. Thus, with both the forward piston 80 and lockup piston 90 applied, the entire modified forward clutch drum assembly 3 rotates in unison and along with the engine crankshaft 4 of the vehicle.

Because the forward clutch hub 70 is applied first, and then the lockup piston 90, a danger associated with premature lockup is avoided. If the lockup piston 90 does get applied before the forward piston 80, the direct hub 60 and forward hub 70 will still not rotate. To enhance the certainty that the transmission will not lockup prematurely, the pump assembly 110 is preferably configured with fail safe switches to prevent the lockup piston from being prematurely applied. In this way, the transmission never goes into lockup mode unless it is already in the drive mode and cannot go into the lockup mode directly from the neutral or reverse mode.

Having thus described the preferred embodiment of the invention, it should be apparent that various different modifications to the invention could be resorted to without departing from the scope of this disclosure. Specifically, while the pump assembly 110 is disclosed with a preferred configuration in FIG. 2, specific details of the pump assembly 110 could be altered so long as the desired result of providing fluid for applying of the pistons 80, 90 is met and the overall size of the pump 110 does not exceed that which is available within the modified forward clutch drum assembly 3. Also, while the exact contours of the various different drums and hubs are provided with great detail to facilitate disclosure of an enabling embodiment of this invention, the contours of these individual parts could be modified in a variety of different ways and still provide the desired function. Similarly, the shape of the pistons and the configuration, diameter, and number of clutch plates could be altered without substantially effecting the result desired herein. Also, while this invention has been described in detail with reference to vehicle applications, it is understood that any mechanical application where an automatic transmission, such as the Turbo-400 hydramatic transmission is utilized could similarly benefit from the use of this invention for increased fuel economy and performance.

I claim:

1. A kit for modifying an input shaft and a forward clutch drum assembly of an automatic transmission to provide the automatic transmission with a lock-up mode where the automatic transmission couples a crank shaft, which provides rotational shaft power to the automatic transmission, to an output shaft of the automatic transmission without any fluid coupling there between when the automatic transmission is in the lock-up mode, the automatic transmission to be modified having a torque converter providing a fluid coupling between the crank shaft and an input shaft, the input shaft coupled to the forward clutch drum assembly, the forward clutch drum assembly selectively driving a gear box at multiple different gear ratios; the kit comprising in combination:

a drive tube replacing the input shaft, said drive tube having a hollow interior passing entirely there through, said drive tube coupled to the torque converter at a first end and a modified forward clutch drum assembly at a second end opposite said first end, said modified forward clutch drum assembly replacing the unmodified forward clutch drum assembly of the automatic transmission, said modified forward clutch drum assembly including means to selectively drive the gear box;

a lock-up shaft, said lock-up shaft colinear with said drive tube and nested within said drive tube, said lock-up shaft having an input end coupled to the crank shaft and an output end coupled to said modified forward clutch assembly; and means to select said modified forward clutch drum assembly, along with the gear box and the output shaft coupled thereto, to be driven by said drive tube or to be driven by said lock-up shaft.

2. The kit of claim 1 wherein said modified forward clutch drum assembly includes at least two inputs, a first input coupled to said drive tube and a second input coupled to said lock-up shaft, said modified forward clutch drum assembly having at least one output coupled to the gear box and the output shaft, said modified forward clutch drum assembly including means to selectively couple either said first input to said output or said second input to said output, whereby said lock-up mode of the automatic transmission as modified by said kit, is activated and deactivated.

3. The kit of claim 2 wherein said first input of said modified forward clutch drum assembly includes a forward drum coupled to said drive tube, wherein said output of said modified forward clutch drum assembly includes a forward clutch hub coupled to the gear box, wherein said modified forward clutch drum assembly includes at least two forward clutch plates interposed between said forward drum and said forward clutch hub, at least one of said forward clutch plates configured to rotate with said forward drum and at least one of said forward clutch plates configured to rotate with said forward clutch hub, and a means to compress said clutch plates together with sufficient compression to cause said forward clutch plates to transmit torque there between.

4. The kit of claim 3 wherein said second input of said modified forward clutch drum assembly includes a lock-up hub coupled to said lock-up shaft, wherein said modified forward clutch drum assembly includes at least two lock-up clutch plates interposed between said lock-up hub and said forward drum, at least one of said lock-up clutch plates configured to rotate with said lock-up hub and at least one of said lock-up clutch plates configured to rotate with said forward drum, and means to compress said lock-up clutch plates together in a manner causing torque to be transmitted between said lock-up hub and said forward drum.

5. The kit of claim 4 wherein said forward drum assembly includes a lock-up drum attached thereto with said lock-up clutch plates interposed between said lock-up drum and said forward drum, said means to compress said lock-up clutch plates together including a lock-up piston interposed between said lock-up drum and said lock-up clutch plates, said piston having a side thereof opposite said lock-up clutch plates accessible to a first source of high pressure hydraulic fluid.

6. The kit of claim 5 wherein said means to compress said forward clutch plates together includes a forward piston interposed between said forward clutch plates and said direct hub, said forward piston having a side thereof opposite said forward clutch plates accessible to a second source of hydraulic fluid, and wherein said kit includes a hydraulic fluid pump, said pump having a drive fluid pathway extending into said forward clutch drum assembly and forming said second source of high pressure hydraulic fluid, a lock-up fluid pathway extending into said forward clutch drum assembly and forming said first source of high pressure hydraulic fluid, and means to selectively direct high pressure hydraulic fluid to said lock-up fluid pathway and said direct fluid pathway.

7. The kit of claim 6 wherein said drive fluid pathway passes through said lock-up drum and said forward drum and exits said forward drum adjacent said forward piston and wherein said lock-up fluid pathway passes through said lock-up drum and exits said lock-up drum adjacent said lock-up piston.

8. The kit of claim 7 wherein said drive tube, said lock-up shaft, and said modified forward clutch drum assembly of said kit exhibit an overall length similar to an overall length of the input shaft and the forward clutch drum assembly replaced by said kit.

9. The kit of claim 8 wherein said pump assembly includes a solenoid therein, said solenoid providing said means to selectively direct high pressure hydraulic fluid to said lock-up fluid pathway, said solenoid coupled to a lock-up mode activation means.

10. A method for modifying an input shaft and a forward clutch drum assembly of an automatic transmission to provide the automatic transmission with a lock-up mode in which the automatic transmission couples a crankshaft, which provides rotational shaft power to the automatic transmission, to an output shaft of the automatic transmission without any fluid coupling there between when the automatic transmission is in the lock-up mode, the automatic transmission to be modified having a torque converter providing a fluid coupling between the crank shaft and an input shaft, the input shaft coupled to the forward clutch drum assembly, the forward clutch drum assembly selectively driving a gear box at multiple different gear ratios; the method including the steps of:

replacing the input shaft with a drive tube, the drive tube having a hollow interior passing entirely there through, the drive tube coupled to the torque converter at a first end and a modified forward clutch drum assembly at a second end opposite the first end;

replacing the forward clutch drum assembly with the modified forward clutch drum assembly;

nesting a lock-up shaft within the drive tube, the lock-up shaft having an input end coupled to the crank shaft and an output end coupled to the modified forward clutch assembly; and providing the automatic transmission with a means to select whether the modified forward clutch drum assembly is driven by the drive tube through the torque converter or driven by the lock-up shaft.

11. The method of claim 10 including the further step of providing the modified forward clutch drum assembly with a lock-up drum, a forward clutch hub, and a lock-up hub, the lock-up drum coupled to said drive tube, the lock-up hub coupled to the lock-up shaft, means to transmit torque between the lock-up drum and the forward clutch hub and means to transmit torque between the lock-up hub and the forward clutch hub.

12. The method of claim 11 including the further step of providing the modified forward clutch drum assembly with a forward piston and at least two forward clutch plates interposed between the forward drum and the forward clutch hub; and provided the modified forward clutch drum assembly with a lock-up piston and at least two lock-up clutch plates interposed between the lock-up hub and the lock-up drum; the forward clutch plates and the lock-up clutch plates, when compressed together by the forward piston and the lock-up piston, causing torque to be transmitted between the forward drum and the forward clutch hub and between the lock-up hub and the lock-up drum, such that when the lock-up clutch plates and the forward clutch plates are both compressed together with torque being transmitted there between, the lock-up hub is caused to rotate with the forward drum and the forward clutch hub.

13. The method of claim 12 including the further step of sizing the drive tube, the lock-up shaft and the modified forward clutch drum assembly to have an overall length similar to an overall length of the input shaft and the forward clutch drum assembly replaced by said method.

14. The method of claim 13 including the further step of providing a pump assembly having a means to direct high pressure hydraulic fluid through a drive fluid pathway leading from the pump assembly to the forward piston and a lock-up fluid pathway leading from the pump assembly to the lock-up piston, the forward piston oriented adjacent the forward clutch plates such that the forward piston compresses the forward clutch plates together when high pressure hydraulic fluid is applied adjacent thereto and the lock-up piston oriented adjacent the lock up clutch plates such when high pressure hydraulic fluid is applied adjacent the lock-up piston, the lock-up piston compresses the lock-up clutch plates together, the pump assembly including means to control flow of high pressure hydraulic fluid to the forward piston and the lock-up piston.

15. The method of claim 14 including the further step of splining the lock-up shaft to the crank shaft in a manner preventing slippage between the lock-up shaft and the crank shaft.

* * * * *